(12) United States Patent
Testa

(10) Patent No.: US 12,545,328 B2
(45) Date of Patent: Feb. 10, 2026

(54) MOTOR VEHICLE WITH REAR FRAME ASSEMBLY HAVING A CENTRAL CRASH BOX

(71) Applicant: FERRARI S.P.A., Modena (IT)

(72) Inventor: Daniele Testa, Modena (IT)

(73) Assignee: FERRARI S.P.A., Modena (IT)

( * ) Notice: Subject to any disclaimer, the term of this patent is extended or adjusted under 35 U.S.C. 154(b) by 512 days.

(21) Appl. No.: 18/183,723

(22) Filed: Mar. 14, 2023

(65) Prior Publication Data
US 2023/0303178 A1  Sep. 28, 2023

(30) Foreign Application Priority Data

Mar. 24, 2022 (IT) ........................ 102022000005870

(51) Int. Cl.
*B62D 21/15* (2006.01)
*B62D 21/11* (2006.01)
*B62D 25/08* (2006.01)

(52) U.S. Cl.
CPC ............ *B62D 21/152* (2013.01); *B62D 21/11* (2013.01); *B62D 25/082* (2013.01)

(58) Field of Classification Search
CPC ..... B62D 21/155; B62D 21/11; B60K 5/1208
See application file for complete search history.

(56) References Cited

U.S. PATENT DOCUMENTS

| | | | |
|---|---|---|---|
| 4,449,603 A | 5/1984 | Langwieder et al. | |
| 8,011,695 B2 * | 9/2011 | Kosaka | B62D 21/152 280/784 |
| 8,727,063 B1 | 5/2014 | Yamamoto et al. | |
| 11,979,046 B2 * | 5/2024 | Murasato | H02J 7/0042 |
| 2010/0264637 A1 * | 10/2010 | Kosaka | B62D 21/152 280/784 |
| 2014/0338997 A1 * | 11/2014 | Okada | B62D 25/2036 180/68.5 |
| 2019/0016391 A1 * | 1/2019 | Inoue | B62D 21/11 |

(Continued)

FOREIGN PATENT DOCUMENTS

| | | |
|---|---|---|
| DE | 3117378 C2 * 5/1981 | |
| DE | 19926605 A1 * 12/2000 | ........... B62D 21/152 |

(Continued)

OTHER PUBLICATIONS

Italian Search Report for Application No. 102022000005870; Filing Date: Mar. 24, 2022; Date of Mailing—Nov. 10, 2022, 7 pages.

*Primary Examiner* — Nicole T Verley
(74) *Attorney, Agent, or Firm* — CANTOR COLBURN LLP

(57) ABSTRACT

A motor vehicle has a forward moving direction, a rear frame having a front end and a rear end according to the forward moving direction, a driving unit comprising an engine and a gearbox, elastic suspension devices which couple the driving unit to the rear frame in an elastically oscillating manner relative to the rear frame around an equilibrium position, and a crash body for absorbing a rear crash along the forward moving direction, the crash body being fixed to the driving unit so as to project in a cantilever manner from a back of the driving unit according to the forward moving direction beyond said rear end along the forward moving direction.

10 Claims, 3 Drawing Sheets

(56) References Cited

U.S. PATENT DOCUMENTS

2021/0254522 A1    8/2021  Martínez et al.
2022/0289302 A1*   9/2022  Hashida ................ B62D 25/08

FOREIGN PATENT DOCUMENTS

| | | | | |
|---|---|---|---|---|
| DE | 102009032734 A1 | * | 2/2010 | ............. B60R 19/56 |
| DE | 102015013533 B3 | * | 9/2016 | ............. B62D 21/11 |
| DE | 102018116879 A1 | * | 1/2019 | ............. B62D 43/10 |
| DE | 102012108816 B4 | * | 1/2025 | .......... H01M 50/249 |
| EP | 3770041 A1 | * | 1/2021 | ............. B62D 21/11 |
| FR | 2967952 A1 | * | 6/2012 | ........... B60K 5/1275 |
| FR | 3031950 B1 | * | 5/2018 | ............... B60K 5/04 |
| GB | 2569582 B | * | 6/2020 | ........... B60K 5/1216 |
| JP | 3622715 B2 | * | 2/2005 | |
| JP | 2007216901 A | | 8/2007 | |
| JP | 2009067376 A | * | 4/2009 | ........... B62D 25/087 |
| JP | 2019018684 A | * | 2/2019 | ............. B62D 21/11 |
| WO | WO-2009072614 A1 | * | 6/2009 | ........... B62D 21/152 |

\* cited by examiner

MOTOR VEHICLE WITH REAR FRAME ASSEMBLY HAVING A CENTRAL CRASH BOX

CROSS-REFERENCE TO RELATED APPLICATIONS

This patent application claims priority from Italian patent application no. 102022000005870 filed on Mar. 24, 2022, the entire disclosure of which is incorporated herein by reference.

TECHNICAL FIELD

The invention relates to a motor vehicle, in particular a motor vehicle suitable for driving on the road.

PRIOR ART

As is known, the rear portion of a motor vehicle includes a rear frame with a function of supporting various components, as well as a rear crash box fixed so as to project at the rear with respect to the frame and having a function of absorbing rear crashes, in particular crashes occurring along the forward moving direction of the motor vehicle.

In particular, the crash box usually includes a pair of longitudinal members that extend parallel to the forward moving direction along the lateral flanks of the motor vehicle, as well as a cross member extending crosswise to the longitudinal members and having ends respectively fixed to the longitudinal members so as to connect the longitudinal members to each other.

The longitudinal members typically extend from the frame, in particular from a structure for the attachment of a rear suspension, also known as a "rear shock tower", which includes the couplings for the rear suspensions of the motor vehicle.

In some cases, the driving unit of the motor vehicle is located in the rear portion of the motor vehicle and is thus supported by the rear frame.

More specifically, in motor vehicles suitable for driving on the road, the driving unit is supported by the rear frame via a suspension device.

In other words, the driving unit, normally including the engine and the gearbox of the motor vehicle, is suspended with respect to the rear frame via elastic elements.

Typically, the elastic elements are elastic bodies, for example comprising or made of rubber, interposed between the driving unit and the rear frame. The elastic bodies are fixed to both the driving unit and the frame, thereby providing the suspension of the driving unit with respect to the rear frame.

According to the prior art, in some motor vehicles intended exclusively for driving on a track, the driving unit is instead rigidly connected to the frame so that the driving unit effectively forms an integral part of said frame. Motor vehicles of this type are known as motor vehicles with a load-bearing engine.

However, motor vehicles with a load-bearing engine are unsuitable for driving on the road, as the vibrations of the engine are transferred directly to the frame, which makes it very difficult for the driver to handle the motor vehicle during use.

For this reason, the following description will only refer to motor vehicles in which the driving unit is suspended on the rear frame.

Should the driving unit have a relatively large extension towards the back of the motor vehicle, the longitudinal members would consequently have to be made longer than in typical cases so that the weight and dimensions of the motor vehicle, already augmented due to the extension of the driving unit, would increase even further.

This clearly constitutes a first drawback that presents a technical problem in terms of the reduction of the weight and dimensions of the motor vehicle.

A second drawback is more generally associated with the design constraints that the particular dimensions of the longitudinal members and the cross member dictate with respect to the distribution of the components over the total volume of the motor vehicle.

Furthermore, a third drawback is associated with the fact that the longitudinal members usually have a low absorption efficiency, i.e. a low ratio of energy absorbed in the event of a rear crash to total weight.

In light of the above, there is a need to improve known motor vehicles, in particular through the limitation or elimination of the mentioned drawbacks.

An object of the invention is to meet the above need, preferably in a simple and reliable manner.

DESCRIPTION OF THE INVENTION

The object is achieved by a motor vehicle as defined in claim 1.

The dependent claims set forth particular embodiments of the invention.

BRIEF DESCRIPTION OF THE DRAWINGS

In the following, an embodiment of the invention is described for an elucidation of the same by way of a non-limiting example and with reference to the accompanying drawings, wherein.

EMBODIMENTS OF THE INVENTION

Figure 1:
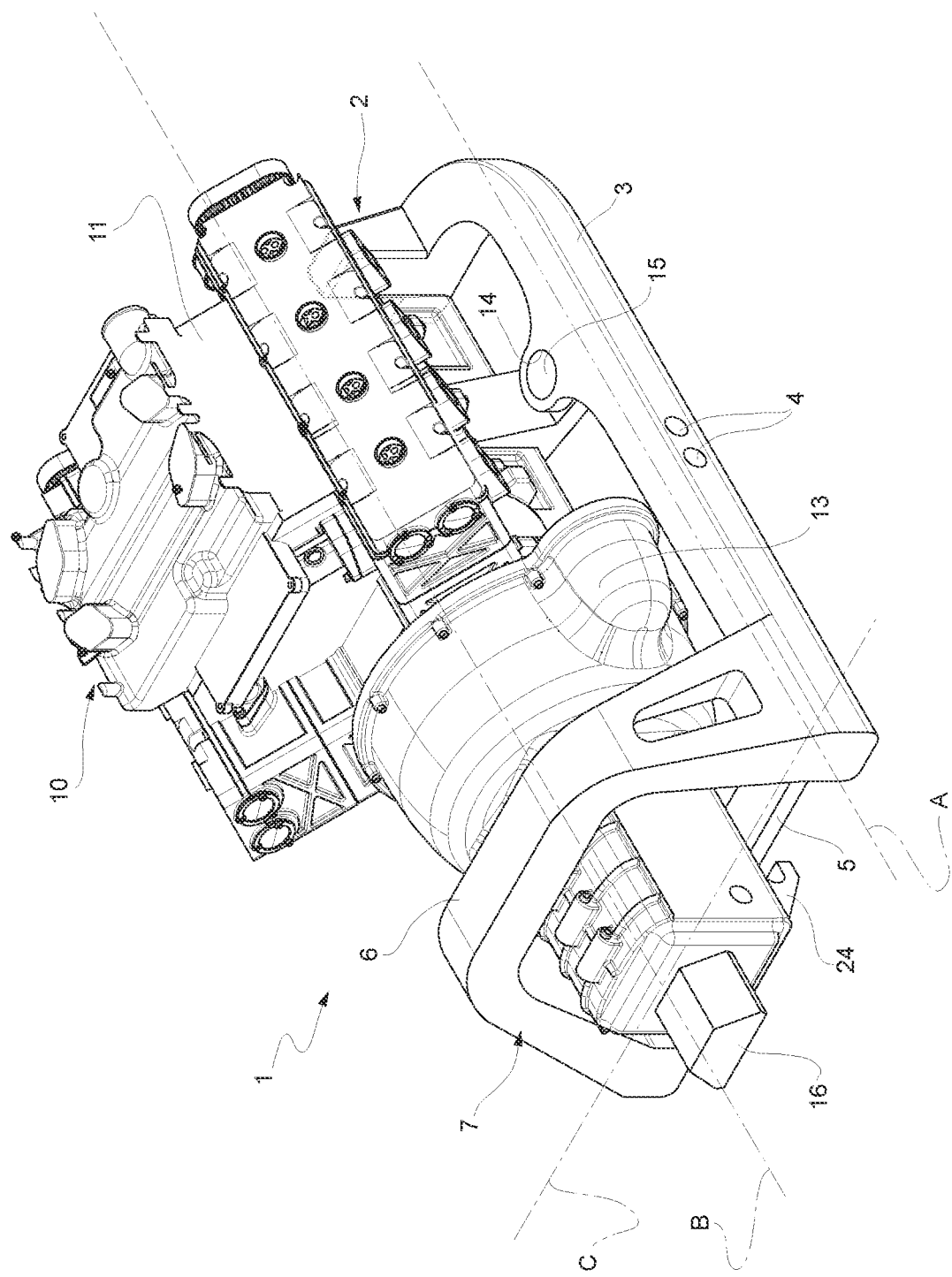
FIG. 1 is a schematic perspective view of a rear portion of a motor vehicle according to the invention.
Figure 2:
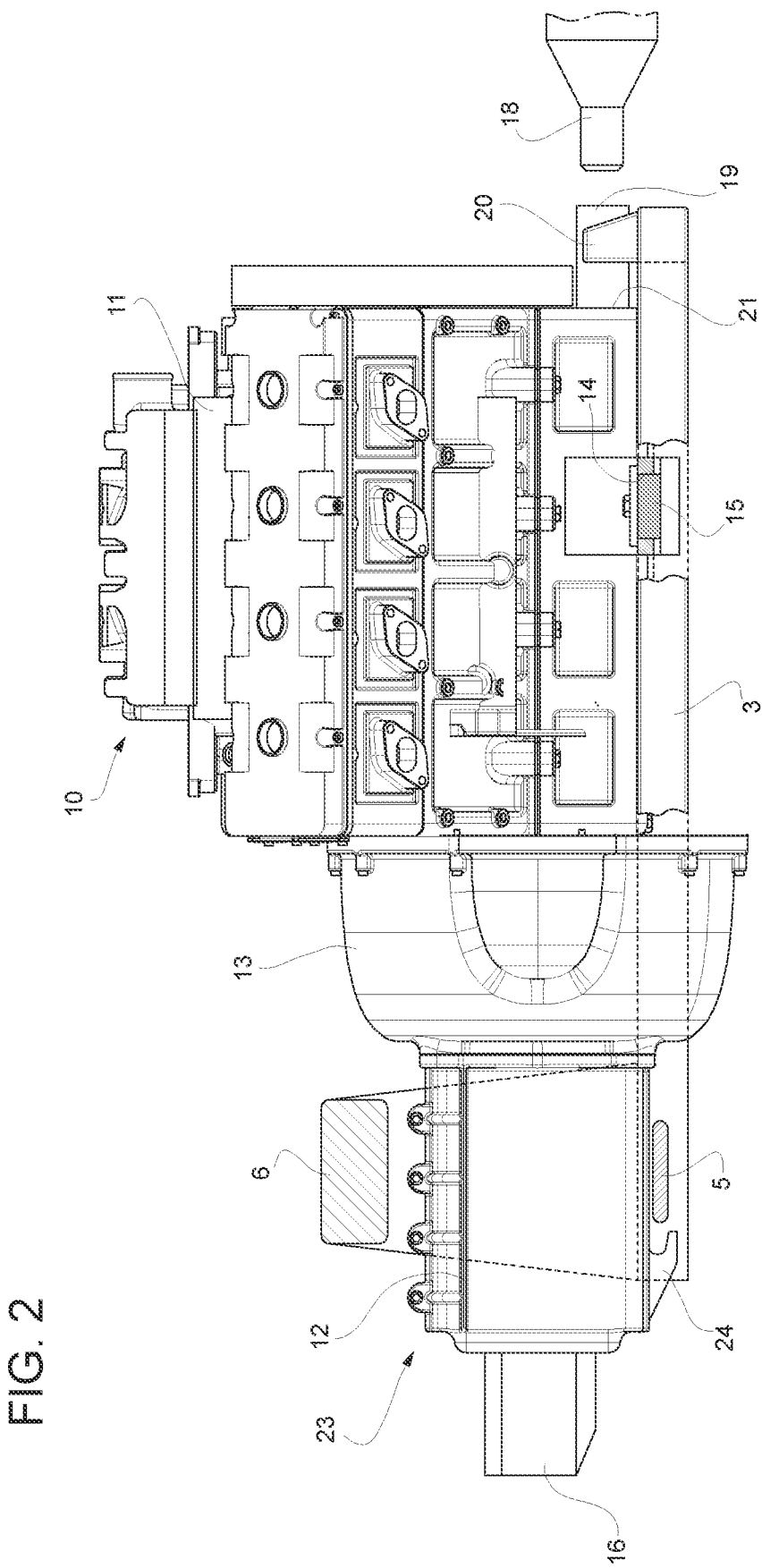
FIG. 2 is a side view of the rear portion, with parts removed for clarity.

In FIG. 1, the reference number 1 is used to indicate, as a whole, a motor vehicle, of which only a rear portion is illustrated.

Like all motor vehicles, the motor vehicle 1 has a normal forward moving direction.

Terms such as "front" and "rear" are thus to be understood with reference to the forward moving direction.

The motor vehicle 1 comprises a body cell which is not illustrated and which defines or surrounds a passenger compartment of the motor vehicle 1 in order to accommodate one or more users.

The motor vehicle 1 further comprises a rear frame 2, in particular fixed with respect the body cell and extending along the forward moving direction. According to the forward moving direction, the rear frame 2 is arranged behind the body cell. Furthermore, more specifically, the rear frame 2 projects in a cantilever manner from the body cell towards the back of the motor vehicle 1.

Figure 3:
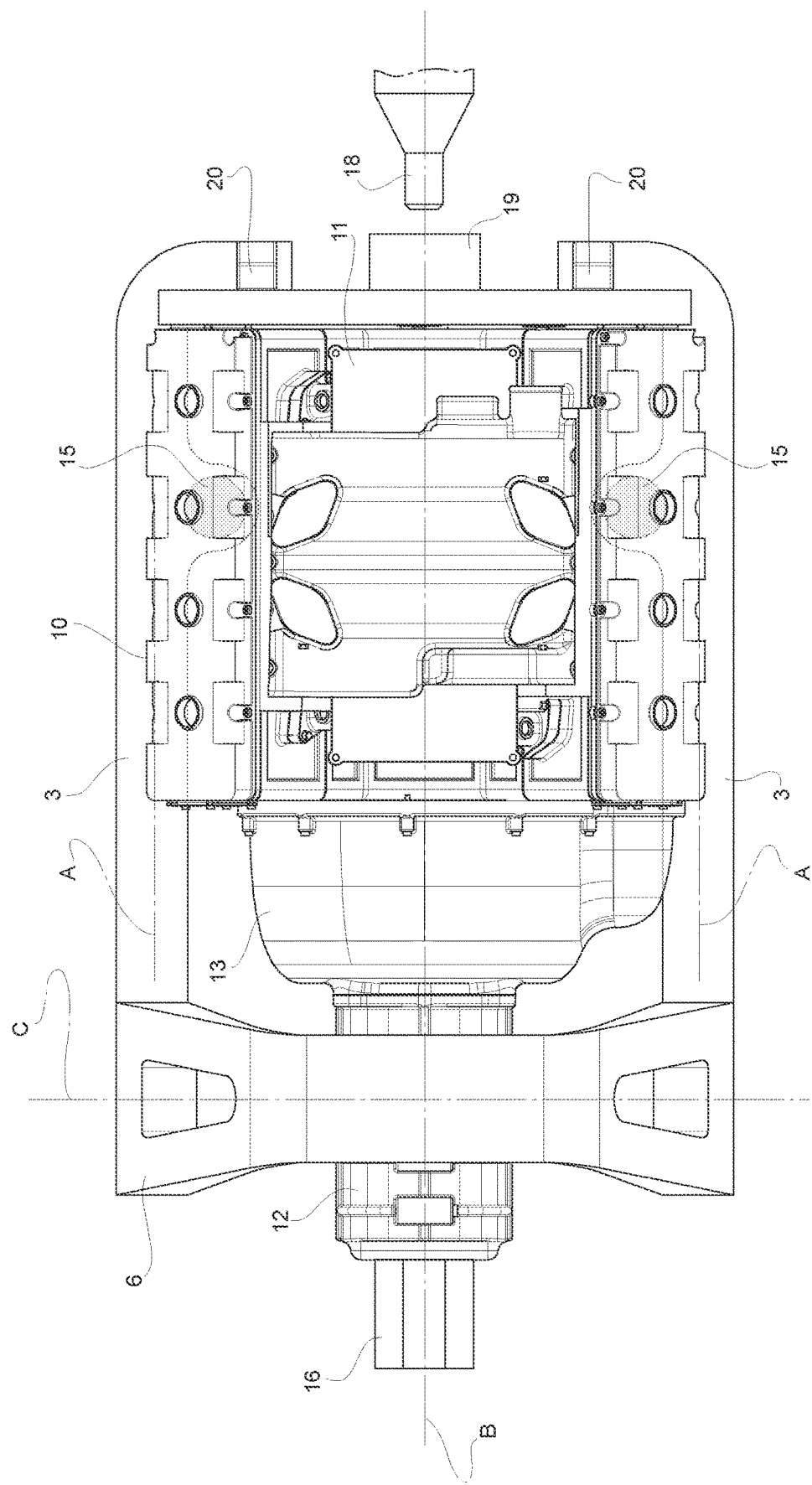
FIG. 3 is a plan view of the rear potion.

As best seen in FIG. 3, the frame 2 comprises two structures 3, which extend along respective axes A parallel to the forward moving direction.

The structures 3 are arranged laterally of a central axis B parallel to the axes A; the axis B is in particular an axis of symmetry for the motor vehicle 1.

Essentially, more specifically, the structures 3 have portions that are equidistant from the axis B along their respective axes A.

The structures 3 form a suspension attachment structure, also indicated as "shock tower".

The structures 3 project in a cantilever manner from the body cell.

The structures 3 are preferably identical to each other. In other words, each characteristic described for one of the structures 3 is also applicable to the other of the structures 3.

Each of the structures 3 has a function of supporting a suspension (not illustrated) of the motor vehicle. In fact, each structure 3 comprises a plurality of attachment elements or couplings 4 configured to allow the coupling of the suspension to said structure 3.

Furthermore, the frame 2 comprises at least one cross member or beam 5 extending crosswise to the axes A and connecting the structures 3.

In other words, the cross member 5 has two ends respectively fixed at the structures 3.

Preferably, the frame 2 also comprises an arched beam 6 that extends so as to form a bridge between the structures 3 above the cross member 5.

The frame 2 thus defines a transversal opening with respect to the forward moving direction between the arched beam 6 and the cross member 5.

In particular, the cross member 5 and preferably also the arched beam 6 are arranged at the rear ends of the structures 3.

In fact, the rear ends of the structures 3 together with the cross member 5 and preferably also the arched beam 6 specifically form part of a rear end 7 of the frame 2 or even form the rear end 7.

In other words, the frame 2 ends at the rear, i.e. on the side opposite the body cell, with the rear end 7.

On the other side, the frame 2 also has a front end 8 opposite the rear end and specifically connected to the body cell in a known manner, which is not illustrated.

The frame 2 extends between the ends 7, 8 along the forward moving direction or according to the axis B.

The motor vehicle 1 further comprises a driving unit or powertrain assembly 10 carried by the frame 2. The unit 10 is arranged along the axis B between the structures 3.

In particular, the unit 10 extends above the cross member 5, more specifically through the opening defined by the cross member 5 and the arched beam 6.

In the illustrated embodiment, the unit 10 is arranged centrally, in a symmetrical manner with respect to the axis B.

The unit 10 performs the function of supplying power to the wheels of the motor vehicle 1, which are not illustrated, thereby allowing the motor vehicle 1 to be driven on the road.

The unit 10 comprises at least one engine and a gearbox, as well as in particular a clutch between the engine and the gearbox for coupling the engine to the gearbox. In use, the engine transfers power to the gearbox via the clutch.

The engine is preferably an internal combustion engine.

Furthermore, the unit 10 comprises an outer casing 11 of the engine and a casing 12 containing the gearbox; in other words, the casing 12 is the gearbox.

In addition, the unit 10 comprises a casing 13 containing the clutch.

The casings 11, 12 are mutually fixed. In this particular case, the casing 13 is also fixed to the casings 11, 12.

In the illustrated embodiment, the casing 12 is arranged behind the casing 11, although the opposite is clearly also possible.

The casing 13 is arranged between the casings 11, 12 according to the axis B or the forward moving direction.

In other words, the casings 11, 12 and also preferably the casing 13 are aligned in a row with respect to one another according to the axis B or the forward moving direction.

In order to couple the unit 10 to the frame 2, the motor vehicle 1 comprises a plurality of elastic suspension devices 15. The unit 10 is coupled to the frame 2 in an oscillating manner around an equilibrium position via the devices 15.

Each of the devices 15 is interposed between the unit 10 and the frame 2.

Furthermore, the devices 15 are fixed to the frame 2, in particular at respective designated seats 14 for accommodating said devices 15.

In turn, the unit 10 is fixed to the devices 15.

The unit 10 is thus coupled to the frame 2 indirectly via the devices 15. In other words, the unit 10 is suspended with respect to the frame 2 via the devices 15.

Being elastic, the devices 15 allow relative movements between the unit 10 and the frame 2. However, the devices 15 resist these movements from the equilibrium position by reacting elastically. The elastic reaction of the devices 15 increases with the increase of the displacement of the unit 10 from the equilibrium position and is directed towards the equilibrium position.

For example, the devices 15 are elastic because they comprise bodies, for example cylindrical or box-shaped blocks, which in turn comprise or are made of rubber or some other elastic material.

Some of the devices 15 can be fixed at the casing 11, as illustrated in the figures, while others of the devices 15 can be fixed at the casing 12; the latter devices 15 are not illustrated for the sake of simplicity, but are potentially fixed to the frame 2 at the cross member 5 and/or the arched beam 6.

The fact that the unit 10 is suspended on the frame 2 renders the motor vehicle 1 potentially suitable for driving on the road; conversely, if the unit 10 had been rigidly connected to the frame 2, the motor vehicle 1 would have had a load-bearing engine and would have thus been unsuitable for driving on the road.

During the use of the motor vehicle 1, the movements of the unit 10 relative to the frame 2 are essentially due to operational vibrations.

In the event of a rear crash, i.e. along the forward moving direction, the devices 15 allow the movement of the unit 10 along the axis B or along the forward moving direction towards the front of the motor vehicle 1, i.e. towards the body cell.

According to the invention, the motor vehicle 1 comprises a crash body 16 for absorbing rear crashes along the forward moving direction.

The crash body 16 is fixed to the unit 10, more specifically at the casing 12, and projects in a cantilever manner from a back of the driving unit 10 according to the axis B or the forward moving direction beyond the end 7.

Specifically, the back of the unit 10 is a rear end of the casing 12, more specifically a cover of the gearbox.

Preferably, the crash body 16 is arranged centrally with respect to the structures 3, i.e. along the axis B. For example, the crash body 16 is symmetrical with respect to the axis B.

In other words, the crash body 16 is arranged centrally according to an axis C orthogonal to the axes A.

In particular, the cross member 5 extends along the axis C.

For example, the crash body 16 comprises or is a beam, in particular box-shaped or tubular. The crash body 16 thus defines a crash box.

The beam of the crash body 16 extends longitudinally in a rectilinear manner along the axis B or the forward moving direction.

A cross-section of the crash body 16 has in particular a trapezoidal shape. Alternatively, the cross-section can also have more than four corners, for example six.

The crash body 16 is thus internally hollow along the axis B or the forward moving direction, thereby defining a cavity.

For example, the cavity can accommodate a plurality of light sources or lights, which can be preferably turn on in order to indicate a braking of the motor vehicle 1.

The motor vehicle 1 comprises at least one countering element 18 fixed relative to the frame 2.

The element 18 is aligned with a portion 19 of the unit 10, in particular the front end of the unit 10, according to the forward moving direction or the axis B. In other words, the element 18 faces or is arranged opposite the portion 19. The element 18 is arranged in front of the portion 19 according to the forward moving direction.

The element 18 is spaced apart parallel to the forward moving direction from the portion 19 when the unit 10 is in the equilibrium position. The distance between the element 18 and the portion 19 according to the axis B or the forward moving direction is preferably greater than 30 mm, more preferably greater than 40 mm. This distance is measured when the unit 10 is in the equilibrium position.

In other words, the distance between the element 18 and the portion 19 is such that the unit 10 does not come into contact with the element 18 as the result of the normal operational vibrations associated with a use of the motor vehicle 1 on the road.

Conversely, for a contact to occur between the element 18 and the portion 19, it is necessary for the crash body 16 to be impacted along the axis B or the forward moving direction.

The crash is in fact transferred from the crash body 16 to the unit 10, which consequently moves forward along the forward moving direction or the axis B relative to the frame 2 against the elastic reaction of the devices 15.

The forward motion of the unit 10 relative to the frame 2 can cause contact between the portion 19 and the element 18 which face each other, i.e. which are aligned along the axis B.

The element 18 is configured to define a stop for the unit 10 here.

In particular, the element 18 comprises a bar fixed relative to the frame 2 and extending along the axis B or the forward moving direction towards the portion 19.

In the illustrated embodiment, the element 18 is thus arranged centrally between the structures 3 or according to the axis C.

Preferably, the motor vehicle 1 further comprises two other countering elements 20 fixed relative to the frame 2.

In particular, the elements 20 are arranged symmetrically with respect to the axis B.

The elements 20 are aligned with each other parallel to the axis C and are conveniently identical to each other.

According to the axis C, the element 18 is arranged between the elements 20; however, the elements 20 are conveniently arranged to the rear of the element 18 according to the axis B or the forward moving direction.

As with the element 18, the elements 20 are also aligned with respective portions 21 of the unit 10 parallel to the forward moving direction or the axis B.

The elements 20 face or are arranged opposite the corresponding portions 21. The elements 20 are arranged in front of their respective portions 21 according to the forward moving direction.

The elements 20 are spaced apart parallel to the forward moving direction from the corresponding portions 21 when the unit 10 is in the equilibrium position. The distances between the elements 20 and the corresponding portions 21 according to the axis B or the forward moving direction are preferably greater than 20 mm, more preferably greater than 30 mm. These distances are measured when the unit 10 is in the equilibrium position.

In other words, the distances between the elements 20 and the respective portions 21 are such that the unit 10 does not come into contact with the elements 20 as the result of the normal operational vibrations associated with a use of the motor vehicle 1 on the road.

Conversely, for a contact to occur between the elements 20 and the portions 21, it is necessary for the crash body 16 to be impacted along the axis B or the forward moving direction.

In this respect, the same considerations made for the contact between the element 18 and the portion 19 apply so that these considerations will not be repeated here for the sake of brevity.

Conveniently, the distances between the elements 20 and the portions 21 according to the axis B or the forward moving direction are smaller than the distance between the element 18 and the portion 19 according to the axis B or the forward moving direction.

This way, in the event of a rear crash, the unit 10 encounters the elements 20 before it encounters the element 18, which only comes into contact with the portion 19 after a deformation of the elements 20.

This is convenient inasmuch as the elements 20 receive a lower load than the element 18 would receive if it made contact with the unit 10 first.

This way, the element 18 will instead receive a lesser load because the contact with the portion 19 will occur after the elements 20 have made contact with the portions 21, thus already receiving a part of the total load to be withstood.

In the illustrated embodiment, the elements 20 have the shape of a triangular ramp.

Preferably, the cross member 5 can also define a countering element.

The front end of the unit 10, i.e. the portion 19, is a front portion of the unit 10 relative to the cross member 5.

The unit 10 also has a rear portion 23 relative to the cross member 5. The rear portion 23 includes the rear end of the unit 10. Preferably, the rear portion 23 forms part of the casing 12.

The rear portion 23 comprises an appendage 24 aligned with the cross member 5 parallel to the forward moving direction.

In other words, the appendage 24 is arranged opposite or facing the cross member 5 along the axis B or the forward moving direction.

The cross member 5 is arranged in front of the appendage 24 according to the forward moving direction.

The cross member 5 is spaced apart parallel to the forward moving direction from the appendage 24 when the unit 10 is in the equilibrium position.

The role of the cross member 5 and of the appendage 24 is quite similar to that of the element 18 and the portion 19 and will consequently not be repeated for the sake of simplicity.

Conveniently, the distance of the cross member 5 from the appendage 24 according to the axis B or the forward moving direction is greater than the corresponding distance between the cross member 18 and the portion 19.

In fact, the cross member 5 would be subjected to a greater load than that which would hit the element 18 if the cross member 5 came into contact with the appendage 24 before the contact between the element 18 and the portion 19.

The convenience of the greater distance between the cross member 5 and the appendage 24 is thus similar to that already explained in relation to the distances between the elements 20 and the portions 21 relative to the distance between the element 18 and the portion 19 when the unit 10 is in the equilibrium position.

The portions 21 and the portion 19 form part of the casing 11.

The appendage 24, on the other hand, in particular extends away from the casing 12, more specifically downwards.

The appendage 24 is preferably concave towards the cross member 5.

The appendage 24 comprises or more specifically is a wedge-shaped plate.

The advantages of the motor vehicle 1 according to the invention are evident from the foregoing.

The motor vehicle 1 does not have a bulky rear crash box with two longitudinal members extending longitudinally behind the body cell and a cross member connecting the longitudinal members transversely.

Rather, the motor vehicle 1 has a more efficient, in particular centrally arranged crash body 16.

The crash body 16 is particularly compact, whereby the weight and dimensions of the motor vehicle 1 are reduced compared to the solution with the longitudinal members and cross members.

Finally, it is clear that the motor vehicle 1 according to the invention can be modified and varied without, however, departing from the scope of protection defined by the claims.

In particular, the number and shape of the components described and illustrated may be varied with a great deal of freedom.

Furthermore, each range described should be interpreted as a plurality of individual alternative values. Each individual numerical value within the range is to be considered as specifically described even if not explicitly mentioned.

The invention claimed is:

1. A motor vehicle (1) having a forward moving direction (A, B) and comprising
   a rear frame (2) having a front end (8) and a rear end (7) according to the forward moving direction (A, B),
   a driving unit (10) comprising an engine and a gearbox,
   elastic suspension means (15), which couple the driving unit (10) to the rear frame (2) in an elastically oscillating manner relative to the rear frame (2) around an equilibrium position,
   characterized by comprising
   a crash body (16) for absorbing a rear crash along the forward moving direction (A, B), the crash body (16) being fixed to the driving unit (10) so as to project in a cantilever manner from a back of the driving unit (10) according to the forward moving direction (A, B) beyond said rear end (7) along the forward moving direction (A, B).

2. The motor vehicle according to claim 1, wherein the crash body (16) is centrally arranged according to a direction (C) orthogonal to the forward moving direction (A, B).

3. The motor vehicle according to claim 1, wherein the driving unit (10) comprises a first casing (11) of the engine and a second casing (12) housing the gearbox, wherein the first and the second casing (11, 12) are mutually fixed, the crash body (16) projecting in a cantilever manner from the second casing (12).

4. The motor vehicle according to claim 1, further comprising a first countering element (18) fixed relative to the rear frame (2) and aligned with a first portion (19) of the driving unit (10) parallel to the forward moving direction (A, B) in a front position relative to the first portion (19), the first portion (19) being spaced apart from the first countering element (18) parallel to the forward moving direction (A, B), when the driving unit (10) is in the equilibrium position.

5. The motor vehicle according to claim 4, wherein a first distance between the first portion (19), when the driving unit (10) is in the equilibrium position, and the first countering element (18) parallel to the forward moving direction (A, B) is greater than 30 mm.

6. The motor vehicle according to claim 4, further comprising two second countering elements (20) fixed relative to the frame, the first countering element (18) being arranged between the second countering elements (20) according to a direction (C) orthogonal to the forward moving direction (A, B), wherein the second countering elements (20) are respectively aligned with second portions (21) of the driving unit (10) parallel to the forward moving direction (A, B) in respective front positions relative to the second portions (21), the second portions (21) being respectively spaced apart from the second countering elements (20) parallel to the forward moving direction (A, B), when the driving unit (10) is in the equilibrium position, wherein the second countering elements (20) are arranged at the back of the first countering element (18).

7. The motor vehicle according to claim 6, wherein second distances between the second portions (21), when the driving unit (10) is in the equilibrium position, and the respective second countering elements (20) parallel to the forward moving direction (A, B) are smaller than a first distance between the first portion (19), when the driving unit (10) is in the equilibrium position, and the first countering element (18) parallel to the forward moving direction (A, B), the second than 20 mm.

8. The motor vehicle according to claim 1, wherein the rear frame (2) comprises two structures (3), which extend along respective axes (A) parallel to the forward moving direction (A, B), the driving unit (10) being arranged between said structures (3), wherein the rear frame (2) further comprises a cross member (5) extending crosswise to the forward moving direction (A, B) and connecting said structures (3), the driving unit (10) having a rear portion (23) and a front portion (19) relative to the cross member (5) according to the forward moving direction (A, B).

9. The motor vehicle according to claim 8, wherein the rear portion (23) relative to the cross member (5) comprises an appendage (24) aligned with the cross member (5) parallel to the forward moving direction (A, B), the appendage (24) being spaced apart from the cross member (5) parallel to the forward moving direction (A, B), when the driving unit (10) is in the equilibrium position.

10. The motor vehicle according to claim 9, further comprising a first countering element (18) fixed relative to the rear frame (2) and aligned with a first portion (19) of the driving unit (10) parallel to the forward moving direction (A, B) in a front position relative to the first portion (19), the first portion (19) being spaced apart from the first countering element (18) parallel to the forward moving direction (A, B), when the driving unit (10) is in the equilibrium position, wherein a third distance between the appendage (24) and the cross member (5) parallel to the forward moving direction (A, B), when the driving unit (10) is in the equilibrium position, is greater than a first distance between the first portion (19), when the driving unit (10) is in the equilibrium position, and the first countering element (18) parallel to the forward moving direction (A, B).

* * * * *